US008848027B2

(12) United States Patent
DeLand

(10) Patent No.: US 8,848,027 B2
(45) Date of Patent: Sep. 30, 2014

(54) VIDEO CONFERENCE CALL CONVERSATION TOPIC SHARING SYSTEM

(71) Applicant: Maitland M. DeLand, Lafayette, LA (US)

(72) Inventor: Maitland M. DeLand, Lafayette, LA (US)

( * ) Notice: Subject to any disclaimer, the term of this patent is extended or adjusted under 35 U.S.C. 154(b) by 0 days.

(21) Appl. No.: 13/941,279

(22) Filed: Jul. 12, 2013

(65) Prior Publication Data

US 2014/0222429 A1     Aug. 7, 2014

Related U.S. Application Data

(63) Continuation of application No. 13/756,804, filed on Feb. 1, 2013.

(51) Int. Cl.
| | |
|---|---|
| *H04N 7/15* | (2006.01) |
| *G10L 21/10* | (2013.01) |
| *G10L 15/26* | (2006.01) |
| *G10L 15/08* | (2006.01) |

(52) U.S. Cl.
CPC .............. *G10L 21/10* (2013.01); *G10L 15/265* (2013.01); *G10L 2015/088* (2013.01)
USPC .......................... 348/14.08; 704/270; 704/257

(58) Field of Classification Search
CPC .. G10L 15/265; G10L 2015/088; G10L 21/10
USPC ................. 348/14.08, 14.09; 704/270, 257, 9
See application file for complete search history.

(56) References Cited

U.S. PATENT DOCUMENTS

| | | | |
|---|---|---|---|
| 6,411,683 B1 | 6/2002 | Goldberg et al. | |
| 8,296,152 B2 * | 10/2012 | Issa et al. | 704/275 |
| 8,612,586 B2 * | 12/2013 | Faller et al. | 709/224 |
| 2007/0168446 A1 | 7/2007 | Keohane et al. | |
| 2010/0169435 A1 * | 7/2010 | O'Sullivan et al. | 709/206 |
| 2012/0081506 A1 * | 4/2012 | Marvit | 348/14.12 |
| 2012/0232886 A1 * | 9/2012 | Capuozzo et al. | 704/9 |
| 2012/0236103 A1 | 9/2012 | Cahill et al. | |
| 2012/0323575 A1 * | 12/2012 | Gibbon et al. | 704/246 |
| 2013/0013701 A1 | 1/2013 | Cherukuri et al. | |

FOREIGN PATENT DOCUMENTS

WO     2012-125338 A1     9/2012

OTHER PUBLICATIONS

Blocking people in Hangouts, downloaded from the internet from http://support.google.com/plus/bin/answer.py?hl=en&answer=1623981&topic=1651548&ctx=topic on Feb. 7, 2013, 2 pages.
Facebook Video Calling, downloaded from the internet from https://www.facebook.com/videocalling/ on Feb. 7, 2013, 2 pages.

(Continued)

*Primary Examiner* — Stella Woo
(74) *Attorney, Agent, or Firm* — Eric Sophir; Dentons US LLP

(57) ABSTRACT

Systems and methods are disclosed herein to a method for presenting topics of conversation during a call comprising: connecting, by a computer, a first device and a second device over a network; opening, by a computer, an audio channel that facilitates audio communication between a first user of the first device and a second user of the second device; receiving, by a computer, an audio stream over the audio channel; analyzing, by a computer, the audio stream to determine spoken words said by either the first or second users; correlating, by a computer, the determined spoken words to determine a topic of conversation; and displaying, by a computer, the topic of conversation in an information post to a remote terminal connected to the network.

19 Claims, 7 Drawing Sheets

(56) References Cited

OTHER PUBLICATIONS

Google+, Wikipedia, downloaded from the internet from http://en.wikipedia.org/wiki/Google%2B on Feb. 7, 2013, 15 pages.
Hangouts, Google+ Features, downloaded from the internet from http://www.google.com/+/learnmore/hangouts/ on Feb. 6, 2013, 6 pages.
Help for Skype: How do I send and receive files using Skype for Windows desktop, downloaded from the internet from https://support.skye.com/en/faq/FA3091/how-do-i-send-and-receive-files-using-skype-for-windows-desktop on Feb. 6, 2013, 9 pages.
Help for Skype: Making a group video call, downloaded from the internet from https://support.skype.com/en/faq/FA10614/making-a-group-video-call-windows-desktop on Feb. 6, 2013, 11 pages.
Minor controls in hangouts, downloaded from the internet from http://support.google.com/plus/bin/answer.py?hl=en&answer=1650353&topic=1651548&ctx=topic on Feb. 7, 2013, 2 pages.
Secret Skype: Skype and Facebook integration, Jan. 23, 2013, downloaded from the internet from http://www.pocket-lint.com/news/49389/skype-facebook-integrate-your-tips, 2 pages.
Skype for Windows desktop, Facebook application, downloaded from the internet from http://apps.facebook.com/skype/, on Feb. 6, 2013, 3 pages.
Skype has more features than you'd think, downloaded from the internet from http://www.skype.com/en/features/ on Feb. 7, 2013, 7 pages.
Su, Call your friends right from Facebook, The Facebook Blog, Jul. 6, 2011, htttps://blog.facebook.com/blog.php-?post=10150223135777131, 4 pages.
Who can enter a hangout, downloaded from the internet from http://support.google.com/plus/bin/answer.py?hl=en&answer=1216372&topic=1651547&ctx=topic on Feb. 7, 2013, 1 pages.
International Search Report and Written Opinion dated May 20, 2014 corresponding to International Patent Application No. PCT/US2014/013704, 16 pages.

* cited by examiner ent application Ser. No. 13/756,804, entitled "Video
VIDEO CONFERENCE CALL CONVERSATION TOPIC SHARING SYSTEM

CROSS REFERENCE TO RELATED APPLICATIONS

This non-provisional patent application is a continuation of U.S. patConference Call Conversation Topic Sharing System," and filed on Feb. 1, 2013, the entire contents of which are hereby incorporated herein by reference.

TECHNICAL FIELD

The present invention relates generally to video conferencing, and more particularly, to video conferencing integrated with a social network.

BACKGROUND

Voice over internet protocol (VOIP) and internet video calling provide a means of communication using the Internet. These technology solutions may provide additional communication features or cost savings. For example, VOIP facilitates long distance and international communication typically at a lower cost than conventional phone lines or cellular phone calls. Meanwhile, video chats provide a more intimate communication session between connected users because images of facial expressions are transmitted with an audio stream of a conversation. Because of the benefits, Internet-based communication has become increasingly popular.

Internet-based, real-time communication has also become increasingly popular because these services are more accessible, and in many situations, these services are provided for no additional fee. For example, popular social networking websites, such as Google+ and Facebook, have begun to implement these communication services for free. FIG. 1-3 illustrate how a conventional Facebook video call is initiated. As shown in FIG. 1, a social network webpage for Facebook user "Nathan" 101 is illustrated, which may include a plurality of social networking posts in a "news feed" area 102. A chat friends list 104 appears on the right side of the screen. The chat friends list 104 lists all of Nathan's 101 friends who are currently signed into Facebook and available to chat. Some friends, such as "Cassie" 106, are signed into Facebook through a mobile device. Friends available through a mobile device may not be interacting with the Facebook mobile application, but Facebook servers can send a message to that user's mobile device if Nathan 101 attempts to chat with a user available through the mobile device. Other friends, such as Arun 108, are signed into Facebook and immediately available to chat, as shown by the green dot 110 adjacent to Arun's 108 name.

As illustrated in FIG. 2, if Nathan 201 decides to begin a conversation with Arun 208, Nathan 201 clicks on Arun's 208 name in the chat friends list 204, and a chat window 202 appears at the bottom of the screen. Using the chat window 202, Nathan 201 can chat with Arun 208 through conventional instant messaging. The right side of the chat window title bar 203 displays a start video call button 204. If Nathan 201 presses the start video call button 204, a message is sent to Arun 208 notifying him of Nathan's 201 request to video chat. If Arun 208 accepts Nathan's 201 invitation to video chat, Facebook initiates a connection, and Nathan 201 and Arun 208 may engage in a video conversation.

After clicking the start video call button 204, as shown in FIG. 3, a video chat window 302 appears in the middle of the screen. The video chat window 302 is displayed over the normal social networking information displayed on the social network's website.

Other social network's video chat applications may behave differently than the exemplary Facebook implementation. For example, Google+ creates a unique URL for an initiated Google Hangout and opens Google Hangout in a new internet browser window. Some services may implement their own software to connect video calls, such as Skype, rather than using a web-based application.

While two or more people converse through a video chat, the words said and the topics discussed remain private to the people connected to the video chat. In some situations, privacy is important, especially if video chat participants are discussing confidential or privileged information. However, in other situations, people may desire to be more public and social about their conversation. Currently, social networks, such as Facebook and Google+, fail to make information about the video conversation public. Social networks leave parties not receiving an invitation to the video conversation unaware of the existence of the video chat and the topics of conversation during the video chat.

Further, some users who receive an invitation to video chat may like to join a conversation, but only if the topic of conversation is interesting. Nevertheless, there is no means for the user deciding whether to join to know what the topic of conversation is without first joining the conversation and listening to what is being said. This limitation may cause some users to miss out on interesting conversations.

As a result, video chat services fail to notify users who are not participants to a video conversation of the existence of the conversation and the topics of conversation. As a result, there is a need to notify users of the existence of a video conversation and the topics discussed in the video conversation

SUMMARY

The systems and methods described herein attempt to overcome the drawbacks discussed above by using voice recognition software during an internet call to recognize words said during the conversation. After gathering words, a computer algorithm analyzes the gathered words for trends of commonly said words or topics that correlate the words said during the call. Once at least one topic of conversation is discovered, the topics may be displayed to designated people through a social network. Those designated people can then determine if they want to join the video call based on their interest in the topics of discussion or the call participants.

In one embodiment, a method for presenting topics of conversation during a call comprises connecting, by a computer, a first device and a second device over a network; opening, by a computer, an audio channel that facilitates audio communication between a first user of the first device and a second user of the second device; receiving, by a computer, an audio stream over the audio channel; analyzing, by a computer, the audio stream to determine spoken words said by either the first or second users; correlating, by a computer, the determined spoken words to determine a topic of conversation; and displaying, by a computer, the topic of conversation in an information post to a remote terminal connected to the network.

In another embodiment, a method for presenting topics of conversation during a call comprises connecting, by a computer, a first device and a second device over a network; opening, by a computer, an audio channel that facilitates audio communication between a first user of the first device and a second user of the second device; receiving, by a computer, an audio stream of audio over the audio channel; analyzing, by a computer, the audio stream to determine spoken words said by either the first or second user; filtering, by a computer, unimportant linking words among the words spoken by either the first or second user; identifying, by a computer, a frequently spoken important word among the words spoken, wherein the frequently spoken important word is a word identified as being spoken multiple times during the call; and displaying, by a computer, the frequently spoken important word in an information post to a remote terminal connected to the network.

In another embodiment, a topic of conversation determining system comprising a video chat computer configured to open an audio/video channel to provide an audio/video communication to at least a first and a second client device connected to a social network; a social network computer configured to provide a web interface and a web application of the social network, receive a request from the first client device to open an audio/video communication with the second client device made through the social network web interface, redirect the request to the video chat computer, and display an information post to a remote terminal connected to the social network; and a conversation analysis computer configured to receive an audio stream of the audio/video communication from the video chat computer, analyze the audio stream to determine spoken words said during the audio/video communication, correlate the determined words to determine a topic of conversation, and send the determined topic of conversation to the social network computer for inclusion in the information post.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings.

The embodiments described above are intended to be exemplary. One skilled in the art recognizes that numerous alternative components and embodiments that may be substituted for the particular examples described herein and still fall within the scope of the invention.

Figure 1:
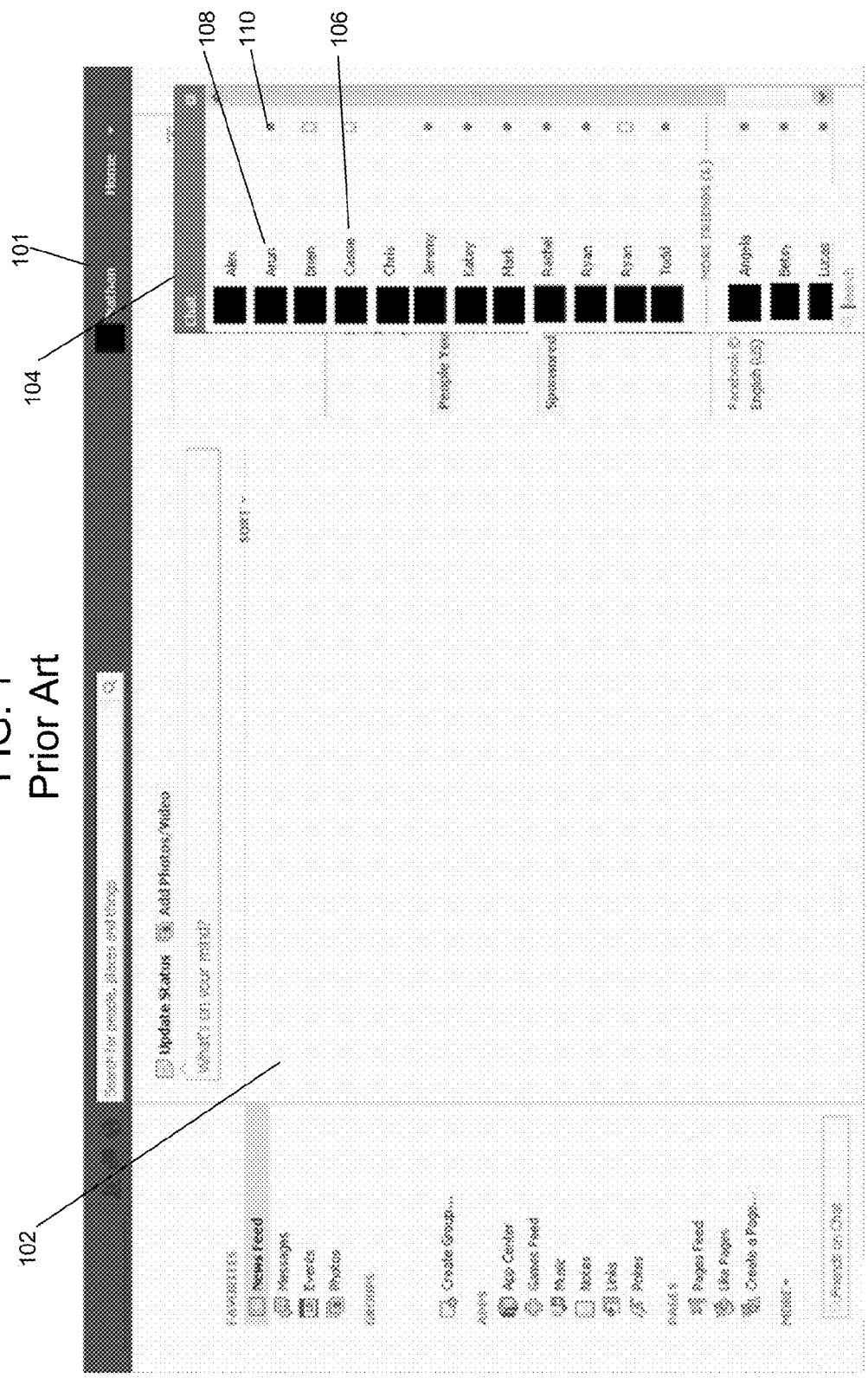
FIG. 1 illustrates a screen shot of a main page of a social network website.
Figure 2:
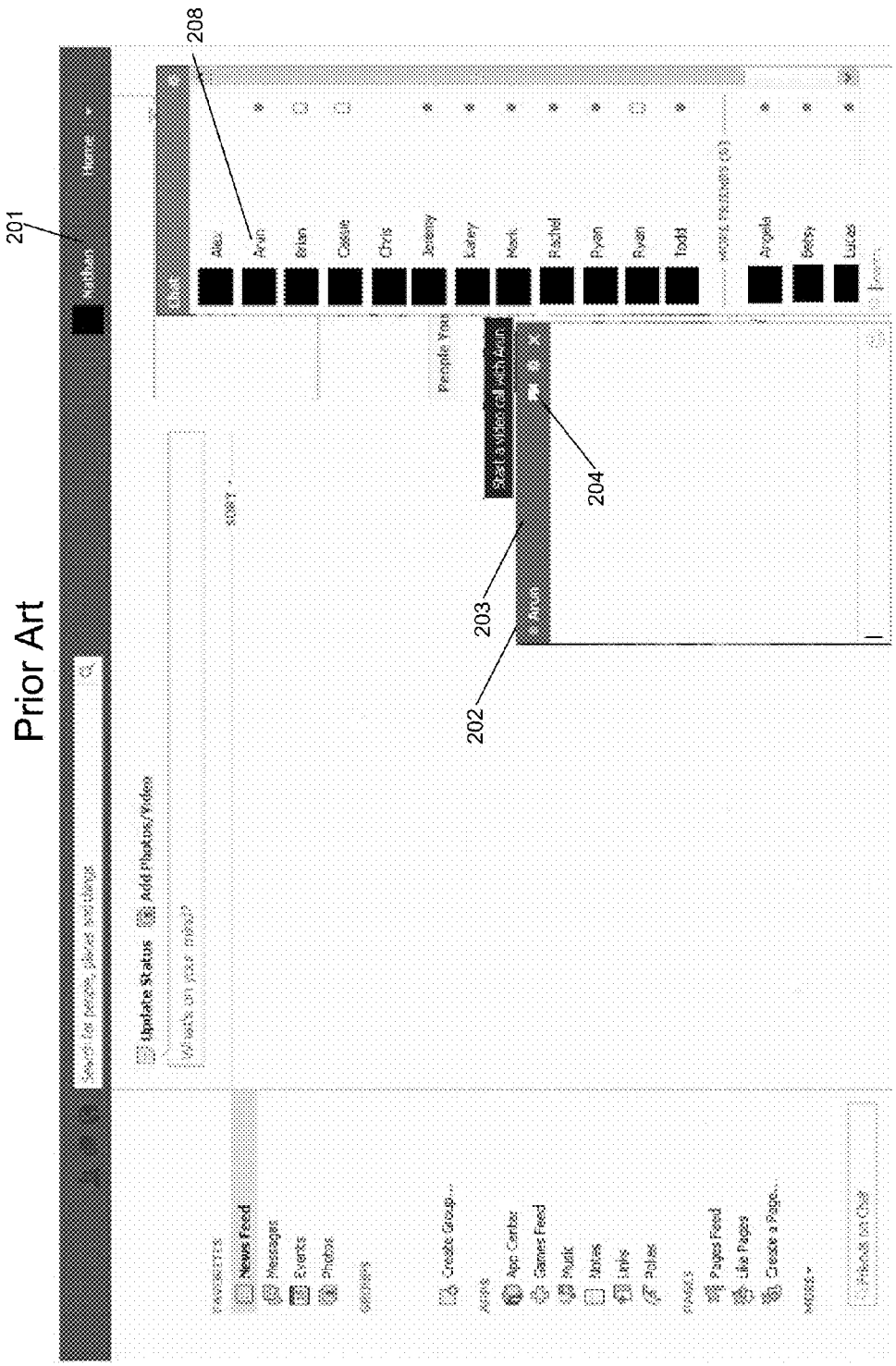
FIG. 2 illustrates a screen shot of a chat window of a social network website.
Figure 3:
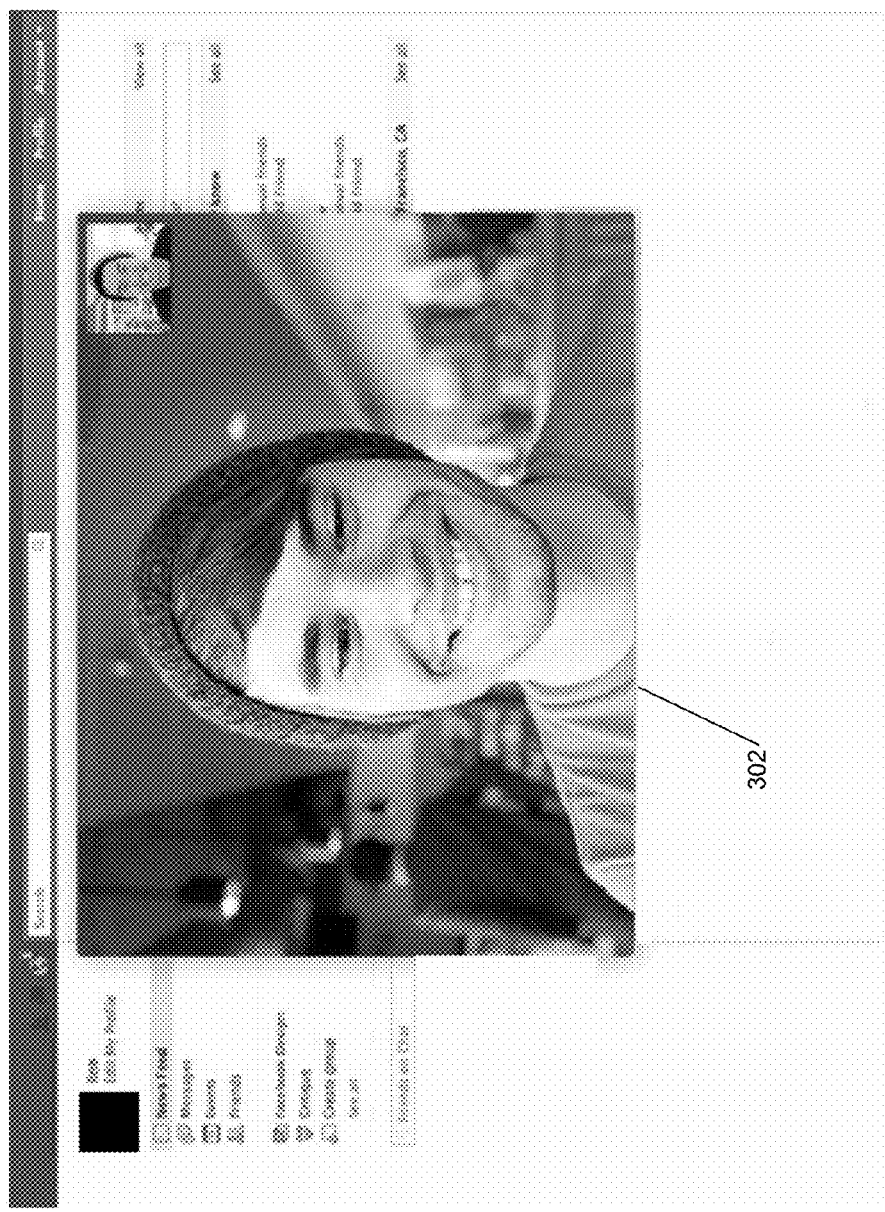
FIG. 3 illustrates a screen shot of a video chat window on a social network website.
Figure 4:
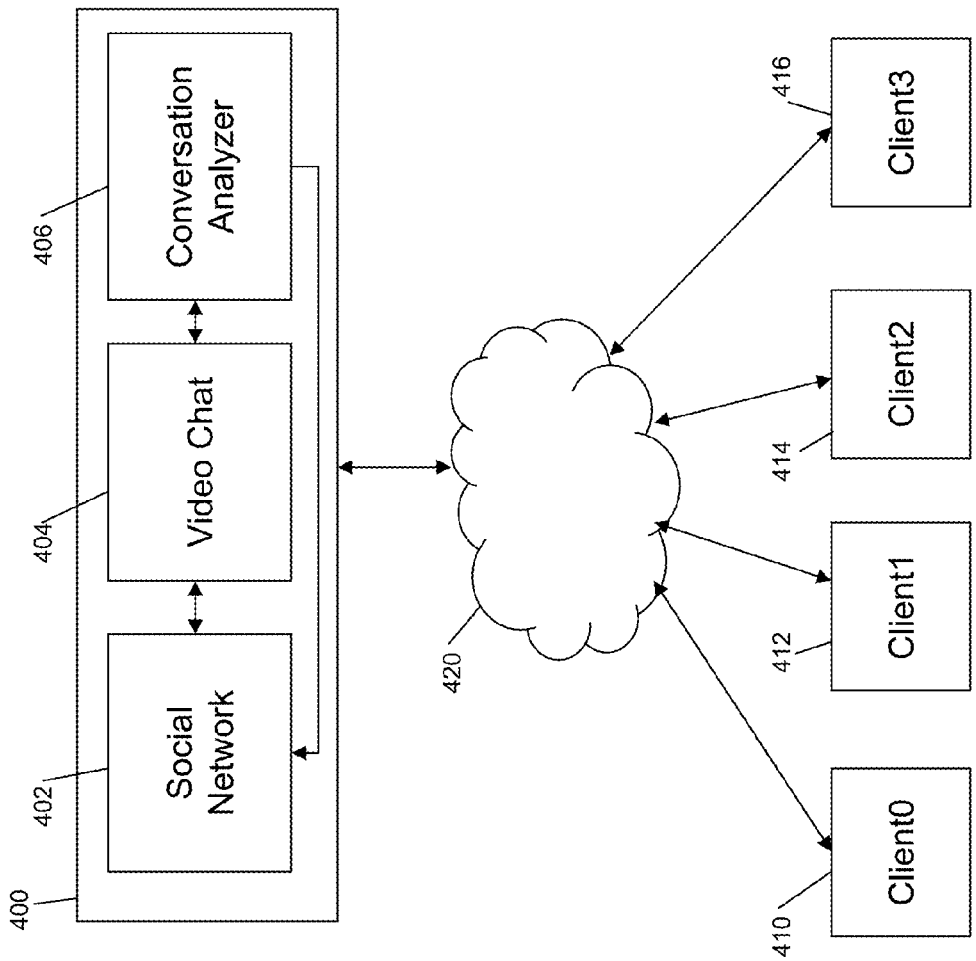
FIG. 4 illustrates a system diagram of a system providing a video chat through a social network according to an exemplary embodiment.

FIG. 4, illustrates a system diagram of a system facilitating video chats according to an exemplary embodiment. As shown in FIG. 4, a social network datacenter 400 is connected to a plurality of client devices 410, 412, 414, 416 through the network 420. The social network datacenter 400 comprises a social network server 402, a video chat server 404, and a conversation analysis server 406. While the social network server 402, the video chat server 404, and the conversation analysis server 406 are each described as a single server, each of these "servers" is most likely comprised of many servers acting in concert to provide a social network website, video chat services, and conversation analysis. Or, the social network server, the video chat server 404, and the conversation analysis server 406 may be three modules of one computer. The number of servers included in the social network datacenter 400 likely depends on the popularity of the website and the number of users accessing the servers comprising the social network datacenter 400.

The social network server 402, the video chat server 404, and the conversation analysis server 406 may each contain computer hardware necessary to facilitate network based communication and web-applications. Such hardware may include, but is not limited to, a processor, computer memory, databases, network interfaces, power supplies, chipsets, communication buses, etc. Using the hardware that comprises each server, the servers of the social network data center 400 provide web-based applications that are accessible to the client devices 410, 412, 414, 416 through the network 420.

The client devices 410, 412, 414, 416 may also include similar computer hardware components to the servers comprising the social network data center 400. The client devices 410, 412, 414, 416 may be personal computers, computer terminals, or mobile devices, such as a smart phone, tablet, PDA, e-book reader, or any other internet-connected device. In general, each of the client devices 410, 412, 414, 416 should have at least a microphone or a web camera, and preferably both so that a full-featured video chat can be enabled.

The network 420 may be any communication network, such as the Internet. However, the network 420 may also be an Intranet, and the social network provided by the social network datacenter 400 may only be offered to members of an organization with access to the Intranet. In either situation, the network 420 may be any type of communication network, whether wired or wireless, that connects digital devices together through a communication protocol, such as TCP/IP, UDP, SSH, ICMP, HTTP, etc.

The social network server 402 provides a web interface and web applications of the social network. The social network server 402 transmits user profile pages to the client devices 410, 412, 414, 416, receives data uploaded from the client devices 410, 412, 414, 416, and displays the uploaded data publicly to other client devices 410, 412, 414, 416. The social network server 402 may include or be connected to an authentication service so that only registered users of the social network may access the social network server 402. Upon connection to the social network server 402, the social network server 402 provides a subset of all the data stored by the social network server 402 to each client device 410, 412, 414, 416. In other words, the client devices 410, 412, 414, 416 receive only the information they have permission to access. For example, a first user may only view information uploaded by the first user's social network connections. Becoming a social network connection involves a second user granting permission to the first user to view information uploaded by the second user. On Facebook, these social network connections are called "Friends," but other social networks may have other permission granting processes. In some cases, the social network server 402 provides the most recently uploaded information by social network connections.

The social network server 402 provides many different applications and services, which are traditionally provided by social networks, such as photo uploading, games, and instant messaging. Social networks are well-known in the art, so a further description of all the services and applications provided by the social network server 402 are omitted.

One of the services provided by the social network datacenter 400 may be a video communication service. The video communication service may be provided by the video chat server 404. Whenever a user of one of the client devices 410, 412, 414, 416 desires to communicate with another user of one of the client devices 410, 412, 414, 416 through audio/video communication, the social network server 402 hands the request to the video chat server 404. The video chat server 404 opens a communication channel between the two of the client devices 410, 412, 414, 416, for example client0 410 and client1 412. If client0 410 initiated the video conference request, the video chat server 404 sends a notification to client1 412 telling the user of client1 412 that the user of client0 410 would like to video chat. If the user of client1 412 accepts, the video chat server 404 sends a message to client0 410 and client1 412 instructing both client devices 410, 412 to start recording video from a web camera and audio from a microphone. The video chat server 404 receives the audio and video from both client devices 410, 412. In one embodiment, the video chat server 404 sends the received audio and video the social network server 402 so that the audio and video feeds can be displayed through the social network web page.

The video chat server 404 may further open a communication channel to one of the other client devices 414, 416 after connecting two client devices 410, 412. For example, if the user of client3 416 notices that the user of client0 410 and the user of client1 412 are chatting, the user of client3 416 may request to join the conversation. Subsequent to the video chat server 404 accepting the request, the audio and video feeds from client0 410 and client1 412 are also sent to client3 416, and client3 may participate in the conversation.

After the video chat server 404 opens a communication channel, the video chat server 404 sends the audio of the conversation to the conversation analyzer 406. The conversation analyzer 406 records the audio stream, analyzes the audio stream to determine words spoken by one of the participants of the conversation, and determines topics of conversation by finding trends in the words spoken by the participants of the video chat. The conversation analyzer 406 may be relatively simple or relatively complex in the search for trends. In a simpler implementation, the conversation analyzer 406 may search for important words said multiple times during a conversation. In a more complex implementation, the conversation analyzer 406 may correlate spoken words to find a topic of conversation. This correlation will be described in further detail below. The complexity of the conversation analyzer 406 may depend on the hardware capabilities of the conversation analysis server 406.

The conversation analyzer 406 may search for important words spoken in the audio stream and disregard insignificant linking words, such as "and," "of," "the," "an," "because," "or," etc.

The conversation analyzer 406 may also be programmed to understand typical sentence structure. By understanding sentence structure, the conversation analyzer 406 may search for nouns and participles, and ignore verbs. The conversation analyzer 406 may ignore verbs because some verbs may be consistently used by one or both parties. Also, the verbs may not be a good indicator of the topic of conversation. For example, the verb "like" may be used very often in a conversation ("I like video chatting," "I like your shirt," "I like a TV show"), but "like" does not accurately portray the topic of the conversation. Instead, the topic of conversation may be more accurately portrayed by the nouns being liked. Thus, especially in the embodiment where the conversation analyzer 406 finds frequently said words, verbs can be ignored in favor of nouns and participles. The conversation analyzer 406 may also ignore adverbs and adjectives in this manner.

Once the insignificant words have been disregarded, the conversation analyzer 406 searches for similarities or correlations between the words. The conversation analyzer 406 may be programmed to understand places, people, activities, products, and things. For example, if the conversation analyzer 406 recognizes the words "bat," "pitch," and "home run," the conversation analyzer 406 may determine that these words share the topic of baseball. The conversation analyzer 406 may be able to recognize famous people's names. In another example, if the conversation analyzer 406 recognizes the words "Kobe Bryant," "Lebron James," and "Kevin Durant," the conversation analyzer 406 determines that the users are discussing basketball players, or more specifically professional basketball players. Finally, if the social network is Facebook, the conversation analyzer 406 may load each conversation participant's "Friends" list and determine if the topic of conversation is a Facebook friend. If a Facebook friend is determined to be a topic of conversation, the social network server 402 may subsequently send a notification to the Facebook friend notifying that user that he or she is a topic of conversation. The notification may also include a hyperlink that allows the user who received the notification to join the video chat conversation.

The conversation analyzer 406 may find topics in the words spoken by participants of a video chat by a plurality of methods. Trend analyzing software is known in the art, and any trend analyzing software may be implemented by the software analyzer 406 to determine topics of conversation. For example, the conversation analyzer 406 may access a database filled with many nouns and participles. Each noun or participle may be associated with many topic tags, and each tag may be a possible topic related to a word. For example, if the conversation analyzer 406 recognizes the word "pitch," that word could be associated with many different topics of conversation. The word "pitch" could relate to a thrown baseball, a business proposal, a perceived frequency of sound, a soccer field, or even an aspect of aircraft flight dynamics. The recognized word "bat" could be baseball equipment or a flying mammal. Using the topic tags that define and associate each word stored in the database to topics of conversation, trends in the words spoken can be quickly found. A tag system is just one simple example of how topics and trends may be discovered by the conversation analyzer 406, but any trend analyzing software currently in existence or not yet developed my be used by the conversation analyzer 406 to find a topic of conversation.

Once the conversation analyzer 406 finds a topic in the words spoken, the conversation analyzer 406 reports the determined topic to the social network server 402. The social network server 402 may display the determined topic to the client devices 410, 412, 414, 416 through the social network website so that other users may see what topics are being discussed by the participants of the video chat. If one such user notices an interesting topic of conversation on the social network website, the user may decide to join the conversation.

Figure 5:
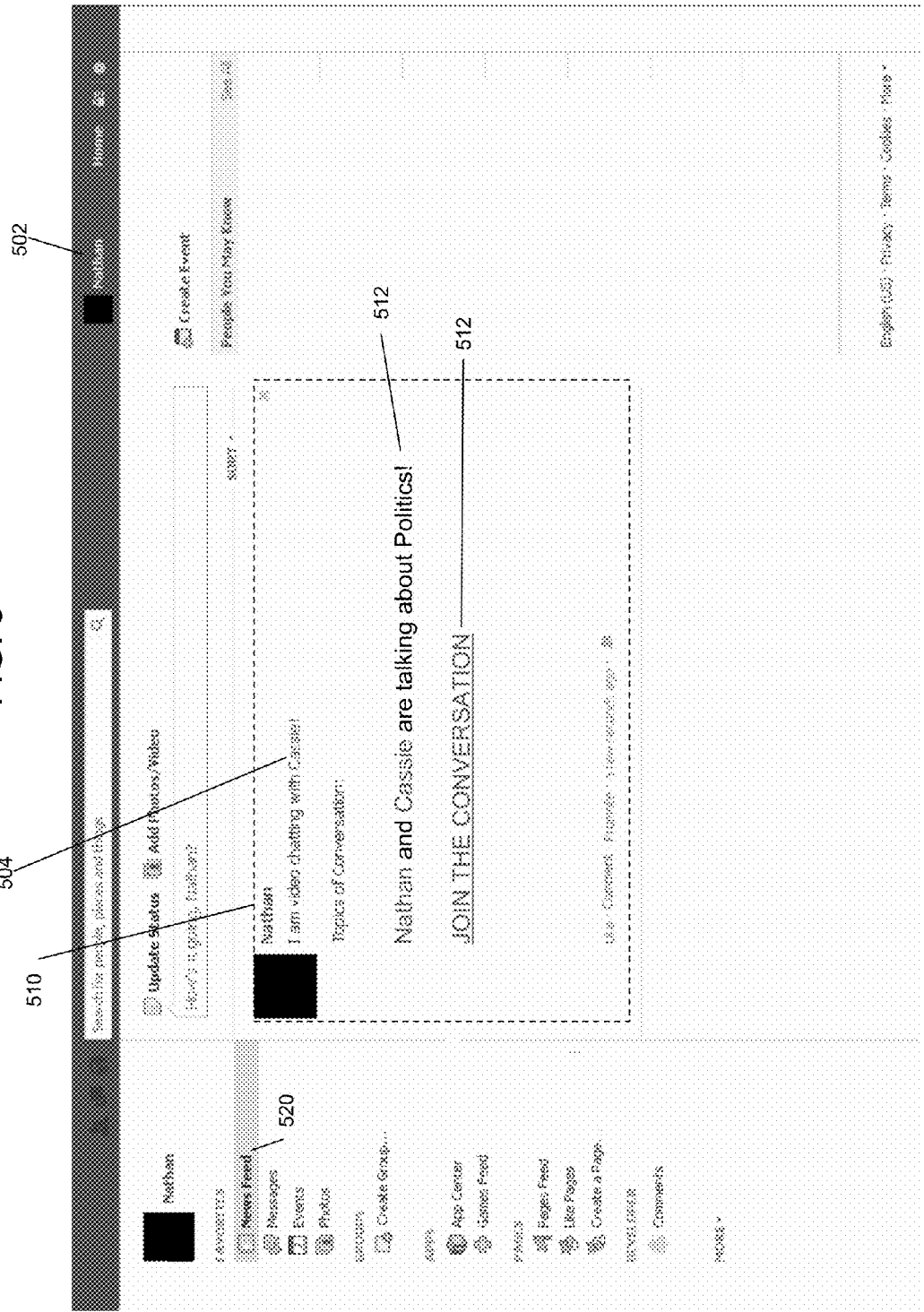
FIG. 5 illustrates a screen shot of a social network post regarding a video chat conversation according to an exemplary embodiment.

FIG. 5 illustrates how the topics of conversation may be displayed to users connected to the social network. In the context of FIG. 5, Nathan 502 has initiated a conversation with user Cassie 504. After the social network server receives an indication that the conversation has begun, the social network server prepares a social network information post 510. The information post 510 may be displayed to all of Nathan's 502 social network connections as well as all of Cassie's 504 social network connections. In the Facebook example shown in FIG. 5, the social network server displays the information post 510 in Nathan's 502 News Feed 520. In Facebook terms, the information post 510 may be called a "Status update." The information post 510 displays who are the participants of the video chat, which in this case is Nathan 502 and Cassie 504, and the topics of conversation 512, which in this case is Politics. Lastly, the information post 510 includes a link 514 that allows third parties to join the conversation. Nathan 502 or Cassie's 504 connections may click the link 514 in the information post 510 to join the video conversation. For example, one of Nathan's 502 connections may decide to join the conversation because they like Nathan 502 and Cassie 504 or because they find discussions on politics interesting. If other users join the conversation between Nathan 502 and Cassie 504, a similar information post 510 will be displayed to the social network connections of the third user who subsequently joins the conversation initially between Nathan 502 and Cassie 504. The information post 510 for the newly joined participants would list Nathan 502, Cassie 504, and any new participants to the conversation.

While Nathan 502 and Cassie 504 converse, the topic of conversation may change. As a result, the social network server may need to periodically update the information post 510. The social network server may update the information post 510 whenever a new topic of conversation is determined by the conversation analyzer. The social network server may append the information post 510 or create a new information post 510 for new topics of conversation. For example, the information post 510, may state "Nathan and Cassie were talking about Politics, but are now talking about Football!" In simpler embodiments, the conversation analyzer quits finding topics of conversation after determining an initial topic of conversation. In more complex embodiments, the conversation analyzer constantly analyzes the audio stream of the conversation to determine if a new topic of conversation is being discussed.

Figure 6:
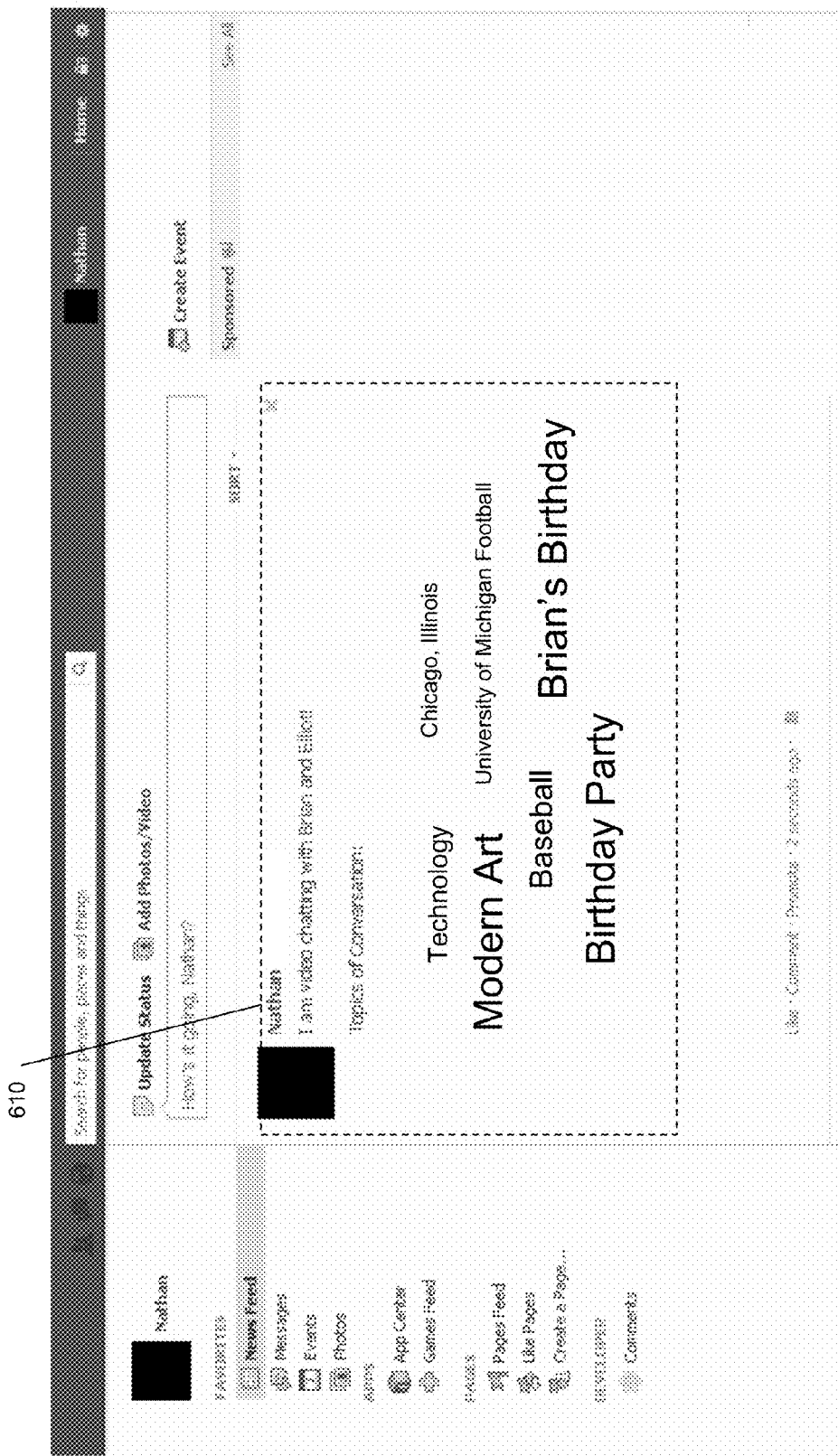
FIG. 6 illustrates a screen shot of a social network post regarding a video chat conversation according to an exemplary embodiment.

FIG. 6 illustrates another screen shot of how topics of conversation may be displayed to social network connections according to an exemplary embodiment. As shown in FIG. 6, a variety of topics are arrayed within an information post 610. Other than displayed topics, the information post 610 is substantially the same as the information post 510 of FIG. 5. The social network server presents the topics in the information post 610 in a variety of different font sizes. The font size may depend on how often the topic is being discussed. Alternatively, a topic presented in a larger font may represent that the participants to the video chat discussed this topic for a very long time. Or, the size of the font may represent how often the conversation analyzer recognized that particular word, where a larger font represents that the word was frequently said by a participant of the video chat. In yet another embodiment, the size of the font may represent how recently the topic was discussed, where a larger font represent that the topic was more recently discussed than a topic presented in a smaller font size.

FIGS. 5 and 6 illustrate situations where a video call is completely open to all social network connections, but the social network server provides users with the ability to modify settings of the video chat. For example, a user may request that the social network server publish an information post 510, 610 only to designated social network connections. A user who sets up the call may limit who can see the video chat and the topics of the video chat, and the user who sets up the video chat may further limit who can join the video chat. Any such video call setting changes may be selected before connecting a first user to a second user. For example, a user who sets up the video call may decide to whether to notify all of his or her social network connections of the existence of the video chat, the participants of the video chat, and the topics of conversation. A user setting up the call may request the social network server to make the "Join Conversation" hyperlink available only to a select few social network connections. The user who sets up the video call may have the option to control who sees the information post 510, 610, who can see the topics of conversation, who can see the participants to the video call, and who can join the call. The social network server may make the video chat settings available to all participants of the video chat, or just the initiator of the call. The user who sets up the call may decide which participants of the call may control video chat settings.

Referring again to FIGS. 4-6, in another embodiment, the social network server 402 may display an information post 510, 610 to specified social network connections if the participants begin to discuss a designated topic of conversation. For example, if Nathan 502 knows that Cassie 504 is particularly interested in modern art, Nathan 502 can request that the social network server 402 notify Cassie 504 if modern art becomes a topic of conversation during a call. As discussed above, if a social network connection's name, who is not a participant of the video chat, becomes a topic of conversation, the social network server 402 can notify the social network connection who became the topic of conversation that they are being discussed by social network connections.

A user may also choose a completely private video chat where no information regarding the video call is displayed to social network connections. In this situation, no information posts are displayed and joining the video call is by invitation only. If a user turns off all of the conversation tracking settings, the video chat server 404 does not communicate with the conversation analyzer 406. While the social network server 402 does not display the participants of the video call and the topics of conversation, the social network server 402 notifies the desired participants and connects the participants using existing video call technology. Conversations without topic tracking are well known in the art and currently provided by many social networks, but the exemplary embodiments provide users with the option to conduct a conventional video call without conversation tracking.

The social network server 402 may also log the topics of conversations. So if Nathan 502 and Cassie 504 talked about politics in a first video conversation, the logging feature may display to both Nathan 502 and Cassie 504 in a second video conversation that the last time they spoke through video chat they discussed politics. The displayed information may remind the participants of the video call that they did not finish their discussion, and they can pick up where they left off or build a new conversation based off of their last conversation.

Figure 7:
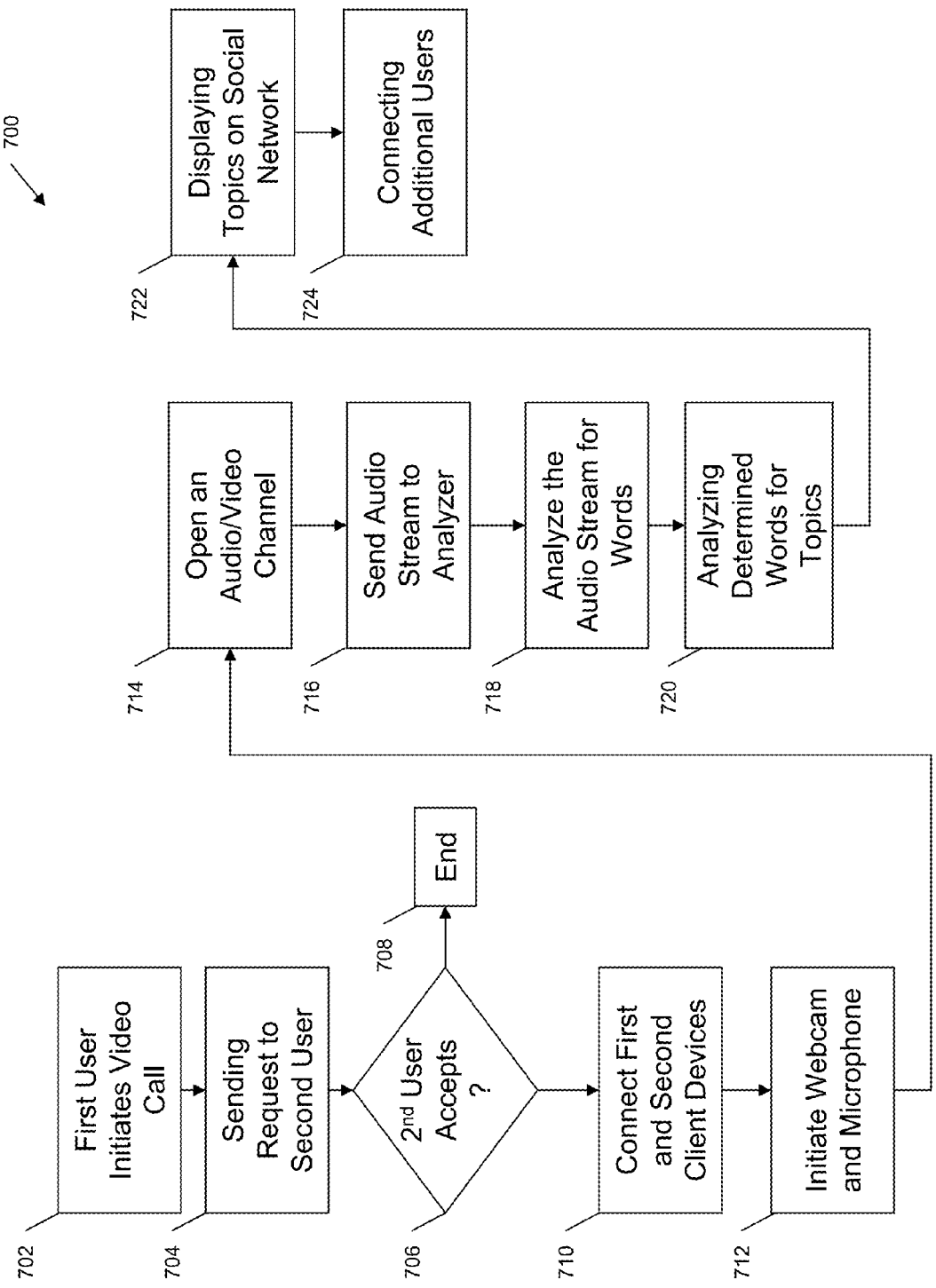
FIG. 7 illustrates a method for notifying social network connections of a video chat conversation and the topics of conversation according to an exemplary embodiment.

FIG. 7 illustrates a method 700 of displaying topics of conversation on a social network according to the exemplary embodiments. The method 700 beings at step 702 where a first user initiates a video call with a second user using a social network. The first user can initiate a video call with a second user by clicking on a start video call button, such as the start video call button presented when instant messaging another user on Facebook. The social network server may send an error message to the first user if the second user is unable to video chat because the second user does not have a webcam or is not currently online.

Once the first user initiates the video call, the social network server may present a plurality of options to the first user. The options presented may give the first user the ability to invite other users to the video chat, and the options allow the first user to control the amount of publicity about the conversation. These options may include whether to display that the first user is video chatting with the second user to social network connections, who can see that the first user is chatting with the second user, whether to display topics of conversation, which social network connections can see the topics of conversation, and which users can join the video chat without an invitation. Many other options may also be displayed. For example, an option may be presented to allow only shared contacts of both the first and second user to join the conversation, which may prevent a stranger to one of the participants from joining. The configurable options may be presented before or after the video chat begins. After the call begins, the options may be accessible from a menu.

A user may create preset settings. By using preset settings, the first user may initiate a video call without having to select typical settings every time they wish to initiate a video call. The preset settings may be a simple auto-fill routine such that the preset list of all options is still presented to a user initiating a call for review. The preset settings may be reviewed by the user before pressing a submit button that initiates the call. An auto-fill routine of this nature allows a user to make minor changes to the preset settings before initiating a call.

After receiving a request to initiate a call, the social network server sends a request to the second user in step 704. The request asks the second user if they would like to join a video chat with the first user. The request may also inform the second user of the settings selected by the first user. For example, the request may ask the second user if they would like to join a video conversation where the topics of conversation will be displayed to all of the first and second user's social network connections. The second user can accept or decline the invitation. The social network server determines if the second user accepted or declined the request in step 706. If the second user declined the request, the method ends in step 708.

The second user may accept the request to join the video chat, but not accept the options selected by the first user. The request may allow the second user to accept the request with changes. By accepting the request with changes, the social network server sends a new request to the first user asking the first user if the settings changed by the second user are acceptable. For example, the first user may desire to have a nonchalant chat with the second user where topics of conversation are displayed publicly and other connections may join the conversation. However, the second user wishes to talk to the first user about a private issue, which the second user may prefer to keep private between the first and second user. As a result, the second user may change the settings, include a message to the first user explaining the need to speak more privately, and the first user can accept or decline the new request. If the first user declines the changed settings, the method 700 also ends.

Once all participants agree to join the video chat and agree to the settings, the method continues and the video chat server connects the first user's client device and the second user's client device through the video chat server in step 710. Subsequently, the video chat server sends a message to both client devices requesting necessary hardware, such as a microphone and webcam, to initiate in step 712. Subsequently, the video chat server opens an audio and video channel in step 714 and sends images and sounds captured by the client devices over the Internet to the other conversation participants. Steps 710-714 may be performed by any existing video chat technologies.

Once both parties are connected to the video chat and begin conversing, the video chat server sends the audio stream of the conversation to the conversation analyzer in step 716. The conversation analyzer receives the audio stream, records the audio, and analyzes the audio stream to determine words spoken by the participants of the video chat in step 718. The conversation analyzer determines words using any existing voice recognition technology.

The conversation analyzer analyzes the determined words in step 720. This step may include the process of eliminating insignificant words and flagging important words or phrases. Once the important words are gathered over a predetermined amount of time, the conversation analyzer attempts to find common themes and topics that correlate the important words. Once a theme or topic has been determined, the conversation analyzer sends the determined topic to the social network server. Upon receiving the determined topic, the social network server creates an information post. The amount of information included in the information post may depend on the settings selected by the first and second users. Once the social network server creates the information post, the social network server displays the information post to all or a subset of the social network connections of the first and second user in step 722, depending on the settings selected by the participants of the video call.

If the information post includes a hyperlink that allows additional users to join the video chat, additional users may be connected to the conversation by the video chat server. If a social network connection selects the link to join the conversation, the social network server sends a message to the video chat server that another user needs to be connected to the video chat. The video chat server then connects the new user using existing video chat methods and technology.

Steps 718-722 may be continuously repeated throughout the duration of the video call. When new topics are determined, the social network server may display the additional topics according to any of the methods discussed above. Depending on the hardware capabilities of the conversation analyzer, topics of conversation may be displayed more or less frequently.

In another embodiment, step 720 may involve finding commonly spoken words or phrases rather than correlating determined words to determine topics. Frequently said words may be assumed to be the topic of discussion. In an embodiment such as this, a new topic may only be assumed if the total amount of times a word or phrase has been said more than the currently displayed word or phrase. Unimportant linking words are disregarded in this embodiment. The frequency of a spoken word may be determined over a predetermined period of time, such as 5 minutes.

The information in an information post may give third parties the ability to join a conversation they were not expressly invited to, or were unaware of, and lets them know what topics their friends are talking about. This additional information is an improvement over the prior art, which provided no information to third parties.

The exemplary embodiments of the present disclosure may be used not only for social uses, but also for commercial uses. For example, if a social network, like Facebook, which has over 800 million users, were to keep track of topics of conversation, that information may be very valuable to advertisers or commercial entities. For example, if a Facebook user commonly discusses a specific brand of clothing during video conversations, the company that designs the brand being discussed could provide special deals or advertisements to the user commonly discussing the company's brand.

The logged topics could also be used to find trends. For example, a computer may analyze the topics determined by the conversation analyzer and find a pulse of the social network. Much like trends on Twitter, the trends of video chats may be determined. If such trends were combined with demographic information, which many social networks have because people upload their birthday, hometown etc., this information could be used for marketing campaigns. Also trends of spoken words in conversation should capture a better understanding of a person's likes and dislikes than a Twitter tweet or Facebook status update because verbal communication is the best way to get to know someone.

While the focus of the exemplary embodiments has been on video chatting, the exemplary embodiments can be applied to any audio conversation, such as VOIP calls or cellular calls. Also, while focus of the information posts has been on social networks, alternative methods of notification may be used. For example, if a first user and second user are conducting a video call through another video call provider, like Skype, the software hosting the video call of this nature may also listen for topics of conversation. The software may connect to a user's email account and send email notifications to specified users of topics of conversation. Similar notification methods may be performed using SMS/MMS messaging to send notifications to a third party's cellular phone.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "generating" or "synchronizing" or "outputting" or "connecting" or "opening" or "receiving" or "analyzing" or "correlating" or "displaying" or "determining" or "disregarding" or "presenting" or "sending" or "accessing" or "finding" or "filtering" or "identifying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A method for presenting frequently spoken words mentioned during a call comprising:
connecting, by a computer, a first device and a second device over a network;
opening, by a computer, an audio channel that facilitates audio communication between a first user of the first device and a second user of the second device;
receiving, by a computer, an audio stream of audio over the audio channel;
analyzing, by a computer, the audio stream to determine spoken words said by either the first or second user;
filtering, by a computer, unimportant linking words among the words spoken by either the first or second user;
identifying, by a computer, a frequently spoken important word among the words spoken, wherein the frequently spoken important word is a word identified as being spoken multiple times during the call;
identifying, by a computer, a connection of either of the users in a social network that is identified by the frequently spoken word using a tag associated with the frequently spoken word, wherein the tag comprises data identifying the connection from a set of connections associated with either of the users; and
generating, by a computer, an information post for the social network displaying to at least the connection of either of the users in the social network on a remote terminal a notification that the connection was identified in the audio stream.

2. The method of claim 1, further comprising:
opening, by a computer, a video channel that transfers video images captured by a camera on the first device to the second device.

3. The method of claim 1, wherein the frequently spoken important word is a noun or a participle.

4. The method of claim 1, wherein the information post includes a hyperlink that connects a third device to the video chat if activated by the third user.

5. The method of claim 1, wherein the information post includes information identifying the first user and the second user.

6. The method of claim 1, wherein the information post is displayed on a social network.

7. The method of claim 1, wherein the information post is sent to a third user's email inbox.

8. The method of claim 1, wherein the information post includes more than one frequently spoken important word.

9. The method of claim 8, wherein the more than one frequently spoken important words are displayed to the remote terminal in different font sizes.

10. The method of claim 9, wherein the font size of a frequently spoken word depends on how long the first and second users discussed each topic.

11. The method of claim 9, wherein the font size of each frequently spoken important word depends on how recently the first and second users said each frequently spoken important word.

12. The method of claim 1, further comprising:
presenting, by a computer, a configurable setting to the first device before connecting the first and second devices;
receiving, by a computer, a selection regarding the configurable setting from the first device;
sending, by a computer, a request to initiate the connection between the first and second devices to the second device; and
displaying, by a computer, the selection regarding the configurable setting to the second user when sending a request to initiate the connection to the second device.

13. The method of claim 12, wherein the second user may change the configurable setting selected by the first user and displayed in the request to initiate the connection when responding to the request to initiate the connection.

14. The method of claim 12, wherein the configurable setting is whether to display the identity of the first and second user to social network connections of the first and second user.

15. The method of claim 12, wherein the configurable setting is whether to display the frequently spoken important word to social network connections of the first and second user.

16. The method of claim 12, wherein the configurable setting is whether to display the frequently spoken important word only to shared social network connections of the first and second user.

17. The method of claim 12, wherein the configurable setting is whether social network connections of the first and second user may join the audio communication.

18. The method of claim 12, wherein the configurable setting is whether only shared social network connections of the first and second user may join the audio communication.

19. A method for presenting keywords mentioned during a call comprising:
connecting, by a computer, a first device and a second device over a network;
opening, by a computer, an audio channel that facilitates audio communication between a first user of the first device and a second user of the second device;
receiving, by a computer, an audio stream over the opened audio channel;
analyzing, by a computer, the audio stream to identify a tag indicating a name of a connection in a set of connections associated with either the first user or the second user in a social network that was spoken by either the first or second user;
generating, by a computer, an information post for the social network displayed to at least the connection having the identified name, wherein the information post is displayed in the social network on a remote terminal, and wherein the information post comprises a notification that the connection was identified in the audio stream.

* * * * *